(12) United States Patent
Boete (10) Patent No.: US 11,007,859 B2
(45) Date of Patent: May 18, 2021

(54) DRIVE SYSTEM FOR AN ENGINE ARRANGEMENT

(71) Applicant: VOLVO TRUCK CORPORATION, Gothenburg (SE)

(72) Inventor: Yann Boete, Lyons (FR)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 16/461,451

(22) PCT Filed: Dec. 16, 2016

(86) PCT No.: PCT/IB2016/001916
§ 371 (c)(1),
(2) Date: May 16, 2019

(87) PCT Pub. No.: WO2018/109515
PCT Pub. Date: Jun. 21, 2018

(65) Prior Publication Data
US 2019/0344653 A1    Nov. 14, 2019

(51) Int. Cl.
*B60K 6/365* (2007.10)
*B60K 6/26* (2007.10)
(Continued)

(52) U.S. Cl.
CPC .............. *B60K 6/365* (2013.01); *B60K 6/26* (2013.01); *B60K 6/383* (2013.01); *B60K 6/387* (2013.01);
(Continued)

(58) Field of Classification Search
CPC .............. F16H 2200/2082; F16H 3/44; F16H 2200/2094; F16H 2200/2005; F16H 3/725;
(Continued)

(56) References Cited

U.S. PATENT DOCUMENTS 5,372,106 A * 12/1994 Botterill ................. F02B 67/06
123/198 R
5,390,555 A * 2/1995 Gotou ..................... F02N 15/066
290/38 A
(Continued)

FOREIGN PATENT DOCUMENTS

DE       100211010088 A1    8/2012
WO       2009121188 A1      10/2009
(Continued)

OTHER PUBLICATIONS

International Sear Report (adted Aug. 11, 2017) for corresponding International App. PCT/IB2016/001916.

*Primary Examiner* — Roger L Pang
(74) *Attorney, Agent, or Firm* — Venable LLP; Jeffri A. Kaminski (57) ABSTRACT

A drive system for an engine arrangement includes a gear reduction mechanism having at least three separate and rotatable junction elements, the rotation speeds of the junction elements being interdependent but not having a fixed ratio the ones relative to the others, and wherein, in the mounted position, among the junction elements, a first junction element is connected to an engine crankshaft, a second junction element is connected to an accessory pulley which is drivingly connected to an electric machine and at least one accessory, and a third junction element. A free wheel is connected to a non-rotating part of the engine arrangement in the mounted position, and the third junction element is configured to be coupled to the free wheel in a first operating phase of the drive system. The third junction element is further configured to be coupled to the engine crankshaft in a second operating phase.

19 Claims, 7 Drawing Sheets

(51) Int. Cl.
*B60K 6/383* (2007.10)
*B60K 6/387* (2007.10)
*B60K 6/485* (2007.10)
*B60K 25/02* (2006.01)
*F02B 67/06* (2006.01)
*F02N 15/02* (2006.01)
*F02N 15/04* (2006.01)
*F02N 15/08* (2006.01)
*F16H 3/72* (2006.01)
*B60K 6/48* (2007.10)

(52) U.S. Cl.
CPC .............. *B60K 6/485* (2013.01); *B60K 25/02* (2013.01); *F02B 67/06* (2013.01); *F02N 15/022* (2013.01); *F02N 15/046* (2013.01); *F02N 15/08* (2013.01); *F16H 3/725* (2013.01); *B60K 2006/268* (2013.01); *B60K 2006/4841* (2013.01); *B60K 2025/024* (2013.01); *B60Y 2200/92* (2013.01); *F16H 2200/2005* (2013.01); *F16H 2200/2082* (2013.01); *F16H 2200/2094* (2013.01)

(58) Field of Classification Search
CPC ........ B60K 6/365; B60K 6/383; B60K 6/485; B60K 25/02; B60K 2006/268; B60K 2025/8024; B60K 6/26; F02B 67/06; F02N 15/022; F02N 15/046; F02N 15/08
USPC ................ 475/5, 307, 308, 12, 13; 180/53.8
See application file for complete search history.

(56) References Cited

U.S. PATENT DOCUMENTS

| | | | |
|---|---|---|---|
| 8,840,500 B2* | 9/2014 | Tamai | B60K 6/445 |
| | | | 475/5 |
| 9,175,659 B2* | 11/2015 | Benz | F02N 15/022 |
| 2002/0195895 A1* | 12/2002 | Souki | F02N 15/023 |
| | | | 310/112 |
| 2011/0319214 A1 | 12/2011 | Showalter | |

FOREIGN PATENT DOCUMENTS

| | | |
|---|---|---|
| WO | 2012097774 A2 | 7/2012 |
| WO | 2013120602 A1 | 8/2013 |

* cited by examiner

DRIVE SYSTEM FOR AN ENGINE ARRANGEMENT

BACKGROUND AND SUMMARY

The invention relates to a drive system for an engine arrangement, an engine arrangement including such a drive system, a vehicle comprises such an engine arrangement, and a method for operating such an engine arrangement.

The invention can be applied in medium and heavy-duty vehicles, such as trucks, buses and construction equipment.

In order to decrease fuel consumption, engine arrangements have been developed to automatically stop an engine when the engine power is not needed—for example at a traffic light or in a traffic jam, when the driver depresses the brake pedal—and restarts the engine in response to a signal—typically when the driver actuates the accelerator pedal.

Such an engine arrangement comprises the engine, an electric machine, one or several accessories, and an accessory pulley to which the electric machine and the accessor (ies) are drivingly connected. A drive system comprising a gear reduction mechanism is used to join the accessory pulley and an engine crankshaft.

The engine arrangement can be in one of:

a starting phase, in which the electric machine, powered by a battery, starts the engine;

a running phase (i.e. normal driving conditions), in which the engine is running, drives the accessory, and drives the electric machine so that said electric machine can charge the battery;

and an electric phase, in which the engine is stopped and the electric machine drives the accessory.

The drive system is designed to allow the engine arrangement to be operated in any of these three phases, and to allow for transition between these three phases.

Although conventional drive systems are generally satisfactory, room for improvement remains.

It is desirable to provide an improved drive system for an engine arrangement.

It is desirable to provide such a drive system which allows smoother transition between at least two operating phases of the engine.

To that end, and according to a first aspect, the invention relates to a drive system for an engine arrangement, the drive system comprising a gear reduction mechanism having at least three separate and rotatable junction elements, the rotation speeds of the junction elements being interdependent but not having a fixed ratio the ones relative to the others, and wherein, in the mounted position, among said junction elements:

a first junction element is connected to an engine crankshaft;

a second junction element is connected to an accessory pulley which is drivingly connected to an electric machine and at least one accessory;

a third junction element.

The drive system further comprises a free wheel which is connected to a non-rotating pan of the engine arrangement in the mounted position, and in that the third junction element is configured to be coupled to the free wheel in a first operating phase of the drive system.

In the first operating phase, the free wheel is configured such that when the third junction element exerts torque on the free wheel in one direction, the free wheel is in an engaged state and stops the rotation of the third junction element, and when the third junction element exerts torque on the free wheel in the opposite direction, the free wheel is in a free state and allows rotation of the third junction element.

The third junction element is further configured to be coupled to the engine crankshaft, in a second operating phase.

In other words, the gear reduction mechanism is designed such that when the first junction element is receiving torque from the second junction element in the first operating phase, the third junction element exerts torque on the free wheel in one direction, the free wheel then being in an engaged state, and such that when the first junction element is generating a positive torque, the third junction element exerts torque on the free wheel in the opposite direction, the free wheel then being in a free state.

The "mounted position" means the position in which the drive system is installed within the engine arrangement and can be operated.

In present application, two parts are "coupled" when they are connected, directly or indirectly, in such a way that they are able to transmit torque from one to the other and in such a way that there is no relative speed of rotation between portions of them which are connected.

The "free state" of the free wheel corresponds to the configuration in which the free wheel disengages a drive member, that is connected to the free wheel or that is part of the free wheel, from a driven member, that is connected to the free wheel or that is part of the free wheel, while in the "engaged state" of the free wheel the drive member is engaged with the driven member by means of the free wheel, acting as a transmitting device. The drive member can be a driveshaft connected to the free wheel or a driveshaft of the free wheel and the driven member can be a driven shaft connected to the free wheel or a driven shaft of the free wheel.

The free wheel mechanism can be made by a special arrangement of the coupling mechanism, as, for example, a saw tooth profile in clutch dog.

In practice, the first operating phase corresponds to a starting phase of the engine, in which the electric machine rotates the engine up to start speed. In this starting phase, the free wheel provides a single way connection from the electric machine to the engine. Indeed:

At the beginning of the starting phase, the rotational speed of the engine is fairly low. Combustion is not established and engine needs torque to rotate. The free wheel, which receives through the third junction element a first torque oriented in one direction, is in an engaged state. This configuration allows transmission of torque from the electric machine to the engine.

When combustion is established, the engine accelerates sharply and the crankshaft provides torque. The free wheel, which receives through the third junction element a second torque oriented in an opposite direction, is in a free state and allows a free acceleration of the crankshaft. No torque, or only an insignificant torque, is transmitted from the engine to the electric machine or to the accessory. The electric machine speed is considered as being uncorrelated to crankshaft speed.

At the beginning of the starting phase, the reduction ratio between the rotational speeds of the engine and the electric machine is $Ra = R0 \times R1a$, wherein:

R0 is the reduction ratio between the electric machine and the accessory pulley. R0 can be around 4 for example;

R1a is the reduction ratio between the accessory pulley and the crankshaft. R1a can be around 4 for example.

As a result, Ra can be around 16 (i.e. 120 rpm at the crankshaft corresponding to 1920 rpm at the electric machine).

However, owing to the free wheel, the invention prevents the torque transmission from the engine to the electric machine at the end of the starting phase, and therefore prevents the engine from damaging the accessory pulley and/or pieces connected to it, such as a belt or the electric machine.

A significant advantage of the invention is that the use of a free wheel allows an automatic and immediate disconnection of the engine and the electric machine as soon as the combustion engine torque becomes positive. As a result, response time problems are avoided.

Subsequently, the drive system can be brought in another operating phase, typically in a running phase, in which the reduction ratio between the rotational speeds of the engine and the electric machine is different from Ra. In this operating phase, said ratio can be about Rb can be about 4 with Rb=R0×R1b and with R1b=1.

The second operating phase can correspond to a running phase, in which the engine is running and drives the electric machine and the accessory.

In the second operating phase, the drive system can also be configured such that the engine may receive power from the electric machine. In this case, the electric machine may use electric energy stored in the battery to boost the engine for performance or fuel consumption purpose.

According to the present invention and due the fact that the third junction element is connectable between the free wheel and the crankshaft, the free wheel is preferably mounted on a side of the gear reduction mechanism that is opposite the engine. As a result, an assembling process of the drive system on the engine block can be made easier. Another advantage resulting from the possible arrangement of the free wheel, is that it makes room to arrange between the engine block and the gear reduction mechanism of drive system a or some specific device(s). For instance, such a device can be an annular dumper that is connected to the end of the crankshaft and that is axially arranged between the engine block and the gear reduction mechanism in order to reduce vibrations on the crankshaft.

Preferably, in the first operating phase of the drive system the third junction element is uncoupled from the engine crankshaft when the third junction element is coupled to the free wheel and in the second operating phase the third junction element is uncoupled from the free wheel when the third junction element is coupled to the engine crankshaft.

In the second operating phase the third junction element can be coupled to the engine crankshaft via the first junction element, that is to say by coupling the third junction element to the first junction element, or via another intermediate piece.

Moreover, the invention provides a drive system having a simple and robust construction, which moreover is fairly compact and has a fairly low weight.

Preferably, the third junction element is movable between a first position, in the first operating phase, in which, in the mounted position, the third junction element is coupled to the free wheel, and a second position, in the second operating phase, in which, in the mounted position, the third junction element is coupled to the engine crankshaft. In an embodiment, the drive system has a main axis that preferably corresponds to the axis of the engine crankshaft and the third junction element is movable in translation along said main axis. This arrangement further simplifies the drive system.

According to an embodiment, the third junction element comprises first coupling members for coupling with the free wheel, and second coupling members for coupling with the engine crankshaft or with the first junction element. For example, the first and/or second coupling members can comprise clutch dog.

According to another embodiment, the third junction element is motionless in translation and the drive system comprises a sliding selector that is permanently coupled in rotation to the third junction and that is movable in translation between a first position, in the first operating phase, in which, in the mounted position, the sliding selector is coupled to the free wheel, and a second position, in the second operating phase, in which, in the mounted position, the sliding selector is coupled to the engine crankshaft. The sliding selector can also be coupled to the engine crankshaft via the first junction element or via another intermediate piece. The sliding selector can integrate a conventional synchroniser system.

The third junction element or the sliding selector can further be configured to take a third position where it is uncoupled from the free wheel and from the engine crankshaft, in a third operating phase. This third operating phase can correspond to an electric phase, in which the engine is stopped and the electric machine drives the accessory. When the third junction element or the sliding selector is uncoupled from the free wheel and from the engine crankshaft, it is in a third position that can be axially intermediate between the first and second positions.

In an embodiment, that the gear reduction mechanism can comprise an epicyclic gearing including a sun gear, an annular gear, planet gears meshing with both the sun gear and the annular gear and supported by a planet carrier. The annular gear is also known as a ring gear.

Each of the sun gear, the annular gear and the planet carrier may be connected to one of the junction elements.

The first junction element can be connected to the planet carrier, preferably is part of the planet carrier, the second junction element is connected to the annular gear, preferably is part of the annular gear, and the third junction element is connected to the sun gear, preferably is part of the sun gear. It results from this arrangement that the accessory pulley can be axially arranged between the engine and the free wheel, preferably between the engine crankshaft and the free wheel. Thanks to that, the free wheel can be assembled at the end of the drive system opposite the engine crankshaft and the free wheel can be assembled in the drive system after having connected the accessory pulley to the annular gear which eases the assembling process of the drive system on the engine arrangement.

In an alternative, the first junction element can be connected to the planet carrier, preferably can be part of the planet carrier, the second junction element can be connected to the sun gear, preferably can be part of the sun gear, and the third junction element can be connected to the annular gear, preferably can be part of the annular gear.

Besides, in the mounted position, the free wheel may be fixedly mounted on a carter of the engine arrangement or a non-rotative part linked to engine block of the engine arrangement.

According to a second aspect, the invention relates to an engine arrangement comprising an engine, an electric machine, at least one accessory, and an accessory pulley to which the electric machine and the accessory are drivingly connected, and further comprising a drive system as previously described.

In practice, the at least one accessory can be one of: a water pump, an air conditioner compressor, a cooling fan.

The engine arrangement may further comprise at least one sensor for detecting the operating condition of the engine, a controller connected to said sensor and capable of controlling an actuator configured to allow coupling or uncoupling the third junction element of the gear reduction mechanism and the free wheel.

The actuator can be configured to move the third junction element of the gear reduction mechanism or said sliding selector coupled to the third junction to place it in one of its first, second and third positions, depending on the detected engine operating condition. The operating condition of the engine can correspond to a current operating phase of the engine or to a desired operating phase of the engine, i.e. when the driver requires the engine to be started, stopped, or restarted.

According to a third aspect, the invention relates to a vehicle comprising an engine arrangement as previously described.

According to a fourth aspect, the invention relates to a method for operating an engine arrangement comprising an engine, an electric machine and at least one accessory, the electric machine and the accessory being drivingly connected to an accessory pulley, and a drive system comprising:

a gear reduction mechanism having at least three separate and rotatable junction elements, the rotation speeds of the junction elements being interdependent but not having a fixed ratio the ones relative to the others, the gear reduction mechanism (20) joining the accessory pulley and an engine crankshaft via two junction elements of the gear reduction mechanism;

a free wheel which is connected to a non-rotating part of the engine arrangement and which can be coupled to the gear reduction mechanism via a third junction element of the gear reduction mechanism. The third junction element is configured to be coupled to the free wheel or to the engine crankshaft.

The method comprising the steps of:

detecting at least one parameter indicating if the engine arrangement is in a starting phase or in a running phase, respectively;

if it is detected that the engine arrangement is in a starting phase, controlling the drive system to couple the third junction element of said gear reduction mechanism with the free wheel;

c) during step b) or subsequently to step b), if it is detected that the engine arrangement is in a running phase; controlling the drive system to couple the third junction element of said gear reduction mechanism with the engine crankshaft instead of the free wheel.

Preferably, while the third junction element is still coupled to the free wheel and the electric machine is starting the engine, the free wheel is firstly operated in an engaged state and is then, in a step that precedes step c), operated in a free state when the engine has started.

In other words, in the starting phase when the electric machine is starting the engine, the gear reduction mechanism is coupled to the non-rotating pan via the free wheel, and the system configuration is such that it allows transmission of torque from the electric machine to the engine. Subsequently, still in the starting phase, when the engine has started the gear reduction mechanism is uncoupled from the non-rotating part.

The use of the free wheel allows a very reactive control of the drive system and therefore improves the engine arrangement robustness and reliability.

Preferably, the third junction element is configured to be coupled to the free wheel, to be coupled to the engine crankshaft or to be uncoupled from both the free wheel and the engine crankshaft. In such a case step a) consists in or comprises detecting at least one parameter indicating if the engine arrangement is in a starting phase, in a running phase or in an electric phase, respectively; and the method comprises a further step d) wherein, if it is detected that the engine arrangement is in an electric phase, the drive system is controlled to uncouple the third junction element from the engine crankshaft and from the free wheel.

In an embodiment, the drive system comprises an epicyclic gearing as the gear reduction mechanism, the epicyclic gearing including a sun gear, an annular gear, planet gears meshing with both the sun gear and the annular gear and supported by a planet carrier, wherein the planet carrier is connected to the engine crankshaft and the annular gear is connected to the accessory pulley. Besides, the method consists in or comprises controlling the position of the sun gear or of a sliding selector coupled to the sun gear relative to the free wheel or to the engine crankshaft such that the sun gear is coupled to the free wheel in step b), the sun gear is coupled to the engine crankshaft in step c) or the sun gear is uncoupled from both the free wheel and the engine crankshaft in step d).

In another embodiment, the drive system comprises epicyclic gearing as the gear reduction mechanism, the epicyclic gearing including a sun gear, an annular gear, planet gears meshing with both the sun gear and the annular gear and supported by a planet carrier, wherein the planet carrier is connected to the engine crankshaft and the sun gear is connected to the accessory pulley. Besides, the method consists in or comprises controlling the position of the annular gear relative to the free wheel or to the engine crankshaft such that the annular gear is coupled to the free wheel in step b), the annular gear is coupled to the engine crankshaft in step c) or the annular gear is uncoupled from both the free wheel and the engine crankshaft in step d).

The reduction ratio between the rotational speeds of the accessory pulley and the crankshaft can be:

$R1b$ in the running phase, with $R1b$ being substantially 1;

$R1a$ in the starting phase, with $R1a \neq R1b$, $R1a$ being for example around 4.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

On FIGS. 3a, 3b, 3c; 5a, 5b, 5c; 6a, 6b, 6c only one half of the drive system is represented, the other half being symmetrically equivalent to the half represented.

DETAILED DESCRIPTION

Figure 1:
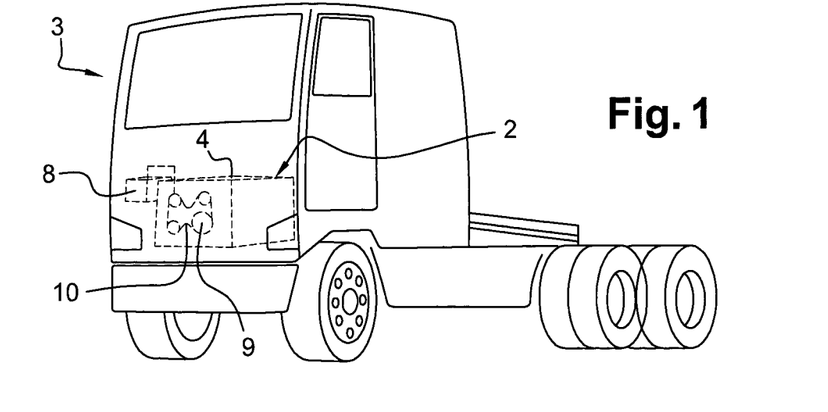
FIG. 1 is a perspective view of a vehicle comprising an engine arrangement according to an embodiment of the invention.

The invention relates to a drive system 1 for an engine arrangement 2 of a vehicle 3, an example of which is illustrated in FIG. 1.

In the illustrated embodiment, the vehicle 3 comprises a cab and can comprise a cargo body (not shown). The engine arrangement 2 may be located in front of the cab, below the seats. Although the vehicle illustrated in FIG. 1 is a truck, the invention is not restricted to this particular vehicle, but may also be used in other vehicles.

Figure 2A:
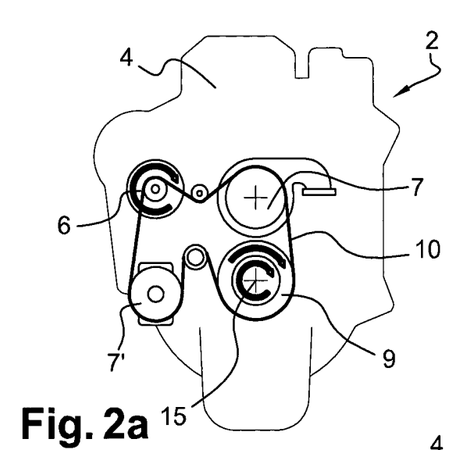
FIG. 2a is a schematic front view of the engine arrangement in a starting phase.
Figure 2B:
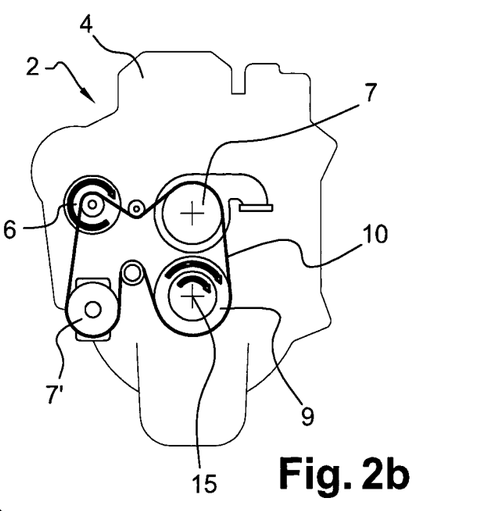
FIG. 2b is a schematic front view of the engine arrangement in a running phase.
Figure 2C:
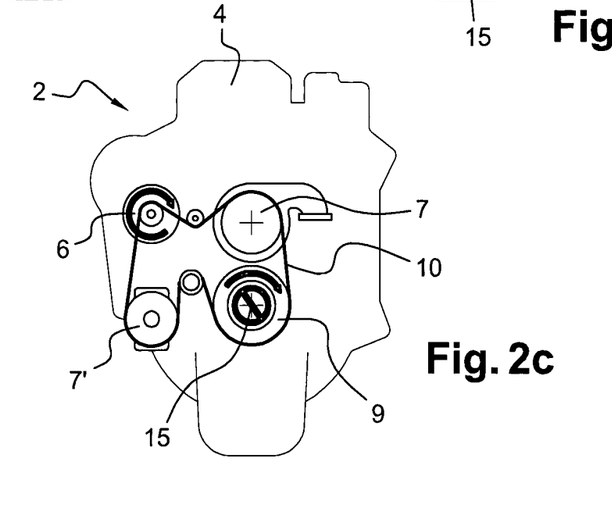
FIG. 2c is a schematic front view of the engine arrangement in an electric phase.

The engine arrangement 2 comprises an engine 4 having a crankshaft 5, an electric machine 6 that can be operated either in a motor mode or in generator mode, and at least one accessory 7 (FIGS. 2a, 2b, 2c). This accessory 7 can be for example a water pump, an air conditioner compressor, a cooling fan etc. In FIGS. 2a-, 2b and 2c, the engine arrangement 2 comprises two accessories 7, 7'. The engine arrangement 2 further comprises a battery 8 connected to the electric machine 6, and an accessory pulley 9.

The electric machine 6, the accessory/accessories 7, 7' and the accessory pulley 9 are drivingly connected, typically through a belt 10 received by the accessory pulley 9 and pulleys 6a, 7a, 7'a connected respectively to the electric machine 6 and the accessory/accessories 7, 7'.

The drive system 1 of the engine arrangement 2 joins the accessory pulley 9 and the engine crankshaft 5. As a result, rotation can be transmitted from the electric machine 6 to the engine 4 and the accessory 7, and from the engine 4 to the electric machine 6 and the accessory 7, by means of the drive system 1, belt 10 and pulleys 9, 6a, 7a, 7'a. In particular, the accessory 7 is configured to be driven by one of the electric machine 6 and the engine 4.

Figure 4:
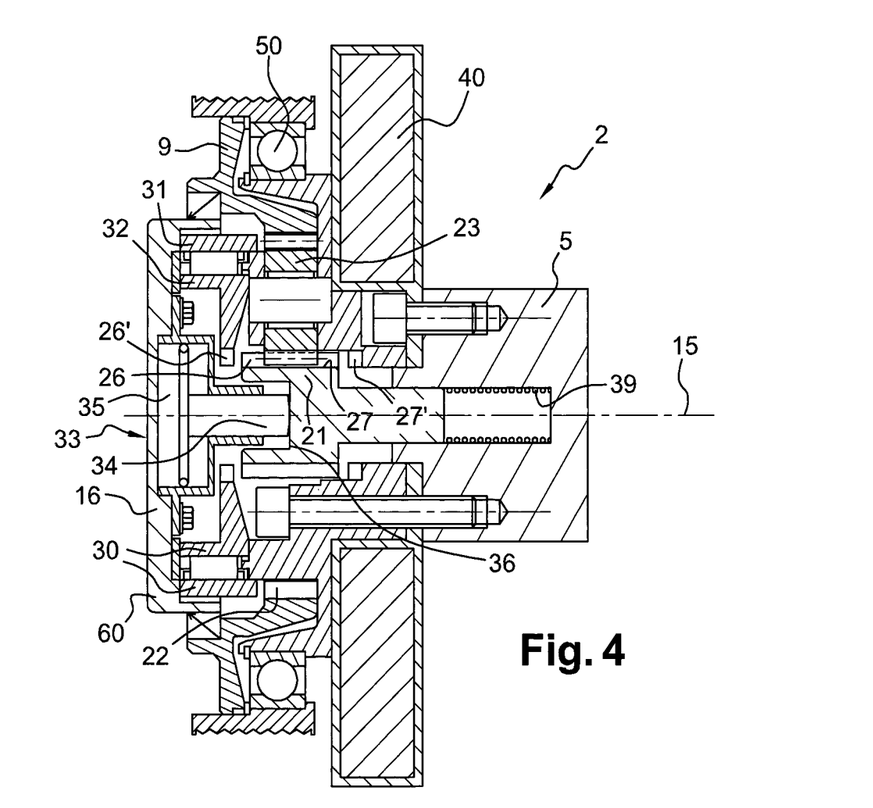
FIG. 4 is partial cross section of the engine arrangement of FIG. 3 in the electric phase according to FIG. 3c.

Such as represented on FIG. 4, the drive system 1 has a main axis 15 which can also be the axis of the engine crankshaft 5 and of the accessory pulley 9.

A drive system 1 and an engine arrangement 2 are described below according to a first embodiment of the invention. This first embodiment is represented on FIGS. 3a, 3b, 3c and 4 wherein arrangement of FIG. 4 presents some variants compared to the arrangement of FIGS. 3a, 3b, 3c.

The drive system 1 comprises a gear reduction mechanism which, in the illustrated embodiment, is an epicyclic gearing 20. The epicyclic gearing 20 includes a sun gear 21 centered on axis 15, an annular gear 22 also centered on axis 15, and planet gears 23 meshing with both the sun gear 21 and the annular gear 22. The planet gears 23 have each an axis 24, and they are all supported by a planet carrier 25. The sun gear 21 is pivotally mounted around the main axis 15 (FIG. 4), for instance, it is pivotally mounted to the planet carrier 25 (FIG. 3a) or to the end of the engine crankshaft 5 (FIG. 4). The annular gear 22 is connected to the accessory pulley 9. The planet carrier 25 is connected to the engine crankshaft 5.

The drive system 1 further comprises a free wheel 30 which is fixedly mounted to a carter 16 of the engine arrangement or to a part that is rotationally fixed with respect to the engine block. Alternatively, the free wheel 30 is rotationally fixed to the carter 16 via an intermediate piece that can comprise a cover 60 of the drive system such as represented on FIG. 4. The cover 60 and the free wheel 30 are arranged on a side of the drive system 1 opposite to the engine crankshaft 5.

In the illustrated embodiment of FIG. 4, the free wheel 30 comprises an outer cylinder 31 fixedly mounted inside the carter 16 or in the cover 60, and an inner part 32. The inner part 32 can freely rotate around axis 15 with respect to the outer cylinder 31 in one direction—which corresponds to a "free" state of the free wheel 30—while the inner part 32 cannot rotate around axis 15 with respect to the outer cylinder 31 in the opposite direction—which corresponds to an "engaged" state of the free wheel 30. Several embodiments can be envisaged for the free wheel 30.

The sun gear 21 can be moved along the axis 15 between:

a first position (FIG. 3a) in which it is coupled to the free wheel 30; and a second position (FIG. 3b) in which it is coupled to the engine crankshaft 5.

To that end, coupling members such as a clutch dog, that is to say a clutch with engaging teeth, can be provided between parts to be coupled. More specifically, the sun gear 21 can comprise first coupling members 26 for coupling with corresponding coupling members 26' arranged on the free wheel 30, and second coupling members 27 for coupling with corresponding coupling members 27' arranged at the end of the engine crankshaft 5 or on the planet carrier such as represented on FIG. 3a.

Besides, the sun gear 21 can be moved to a third position (FIG. 3c), intermediate between the first and second positions along the axis 15, in which the sun gear 21 is uncoupled from the free wheel 30 and from the engine crankshaft 5.

Preferably, in each of said three positions, the sun gear 21 remains meshed with the planet gears 23.

In order to move the annular gear 21, the engine arrangements 2 of FIGS. 3a, 3b, 3c and 4 comprise at least one actuator 33. In the exemplary embodiment shown on FIG. 4, the actuator 33 includes a rod 34 and connected to an actuating cylinder 35. Such as represented on FIG. 4, the actuating cylinder 35 and the rod 34 can be parts of the cover 60 and arranged coaxially with the main axis 15.

As represented on FIG. 4, an end of the rod 34 cooperates axially with an axial end of the sun gear 21. For example, said end of the rod 34 can extend in an axial recess 36 of the sun gear 21 and contact the bottom of the recess. Thus, when the actuator 33 is energized the rod 34 translates, which results in the rod 34 pushing the sun gear 21 axially towards the engine crankshaft 5 against an axial opposite force exerted by a compression spring 39. The compression spring 39 is, for instance, located in the end of the engine crankshaft 5 and is able to push the sun gear 21 in a direction opposite to the rod 34. In a variant the actuating cylinder is able to pull the sun gear 21, in the latter case the engine arrangement 2 doesn't comprise a compression spring able to push the sun gear 21 in a direction opposite to the rod 34.

Figure 3A:
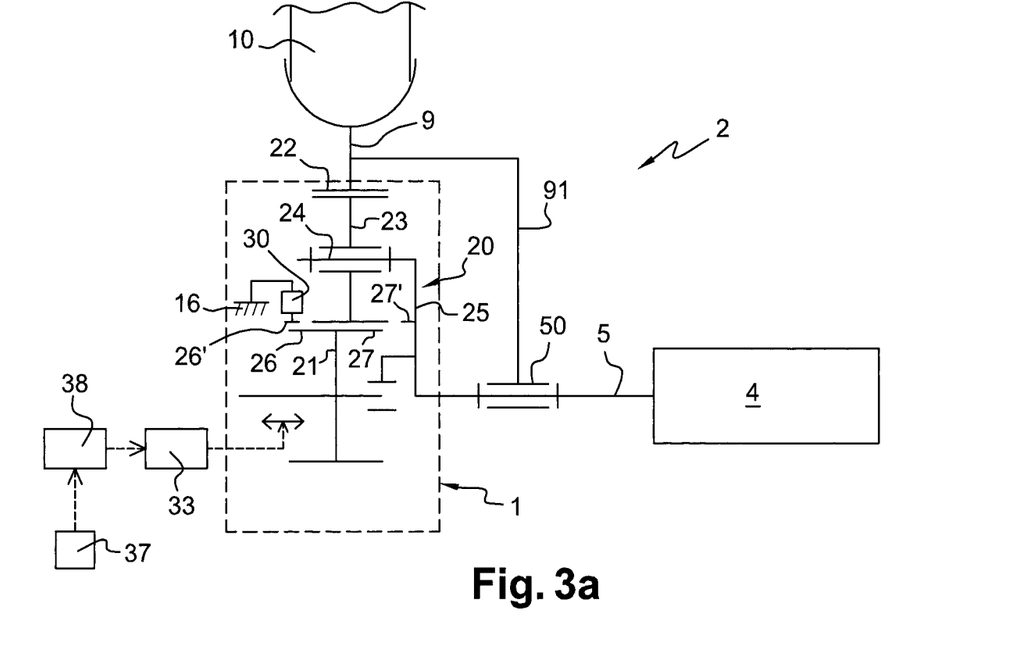
FIG. 3a is a drawing of the kinematic connections between the various components of the engine arrangement, in the starting phase and according to a first embodiment.
Figure 3B:
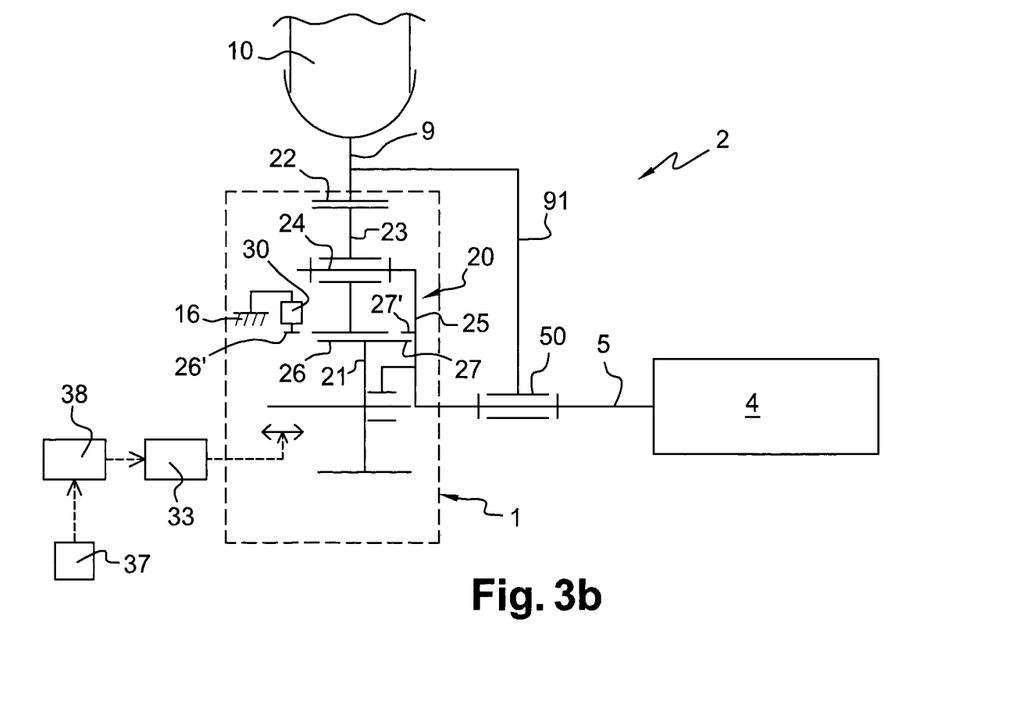
FIG. 3b is a drawing of the kinematic connections of the engine arrangement of FIG. 3a in a running phase.
Figure 3C:
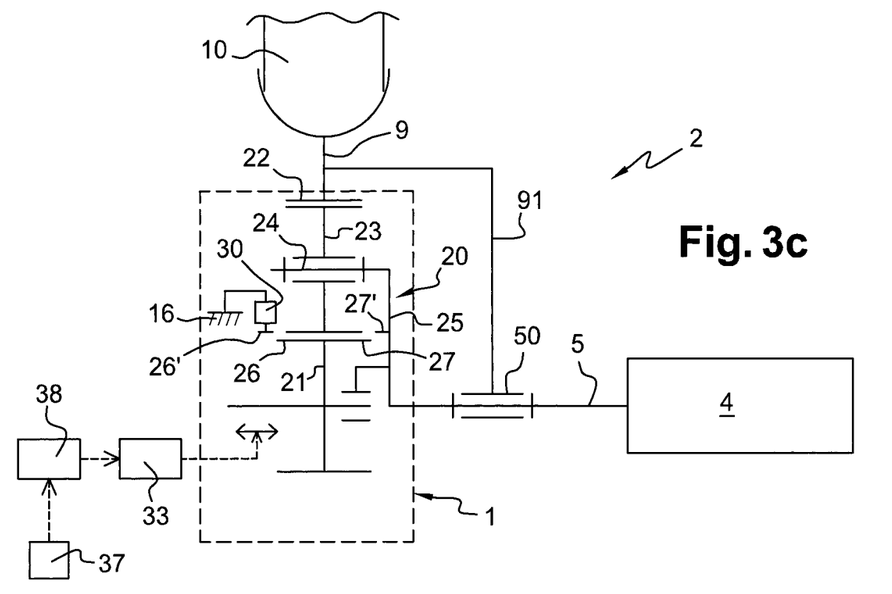
FIG. 3c is a drawing of the kinematic connections of the engine arrangement of FIG. 3a in an electric phase

In another variant, such as represented on FIGS. 3a, 3b, 3c the actuator 33 is integrated in a cover of the drive system 1 or in the drive system 1 and it can be arranged aside the drive system 1.

The engine arrangement 2 further comprises at least one sensor 37 for detecting an operating condition of the engine 4, and a controller 38 connected to said sensor 37 and capable of controlling the actuator 33. Depending on the detected engine operating condition, the actuator 33 is controlled to move the sun gear 21 to place it in one of its first, second and third positions.

The liquid pressure in the actuating cylinder 35 is controlled by the controller 38 to allow the sun gear 21 to be placed in one of the three positions previously described.

Reference is now made to FIGS. 2a and 3a which show the engine arrangement 2 in a starting phase.

When the driver wants to start the vehicle 3, he/she generally turns a key or switches on an ignition switch. As a result, the battery 8 powers the electric machine 6 to start it.

In an embodiment, the first position, i.e. when the sun gear 21 is coupled to the five wheel 30, is the default position. For example, the compression spring 39 can be used to maintain the sun gear 21 in the first position when the controller 38 does not control the actuator 33 to place the sun gear 21 in another position. In a variant, the information "start the vehicle" is detected by the sensor 37 and transmitted to the controller 38 which controls the actuator 33 so that it places the sun gear 21 in the first position.

In this starting phase, the accessory 7 is driven by the electric machine 6. Moreover, the electric machine 6 drives the accessory pulley 9 which in turn rotates the annular gear 22. As the sun gear 21 is coupled to the free wheel 30 which is configured to be in the engaged state at the beginning of the starting phase, the sun gear 21 does not turn, and the planet gears 23 turn about the main axis 15, therefore transmitting rotating movement to the engine crankshaft 5.

In the starting phase, the gear reduction system—i.e. the epicyclic gearing 20—links the rotation of the electric machine 6 with the rotation of the engine crankshaft 5, with a reduction ratio $Ra=R0\times R1a$ between the rotational speeds of the engine 4 and the electric machine 6. For example, Ra can be around 16 with R0 around 4 and R1a around 4.

When combustion is established, engine 4 provides torque, and therefore crankshaft 5 accelerates sharply. As the direction of the torque transmitted in the sun gear 21 changes, this automatically leads to the free wheel 30 transiting to its free state.

When the free wheel 30 is in its free state, even if the sun gear 21 remains coupled to the free wheel 30, no torque or only an insignificant torque is transmitted from the engine 4 to the electric machine 6. This prevents severe stress in the belt 10 and other parts.

When the sensor 37 detects that the engine 4 has been started, the controller 38 controls the actuator 33 so that it places the sun gear 21 in the second position, i.e. coupled to the engine crankshaft 5. The engine arrangement 2 is then in a running phase, as shown in FIGS. 2b and 3b. Some embodiments could require speed synchronization between the electric machine 6 and the engine 4 to ease meshing.

In this running phase (i.e. normal driving conditions), the engine 4 is running. The engine 4 is then capable of driving the accessory 7, and also the electric machine 6 so that said electric machine 6 can charge the battery 8. In the same way, the electric machine 6 can be put in motor mode, providing additional torque to accessory 7 and engine crankshaft 5 by consuming energy stored in battery 8.

More precisely, the crankshaft rotation leads to the rotation of the planet gears 23 about the main axis 15 and to the rotation of the accessory pulley 9 which is coupled to the annular gear 22.

In the running phase, the gear reduction system—i.e. the epicyclic gearing 20—links the rotation from the electric machine 6 toward the engine crankshaft 5, with a reduction ratio $Rb=R0\times R1b$ between the rotational speeds of the electric machine 6 and the engine 4. R1b=1, and thus Rb is different from Ra. For example, Rb can be in the range of 2 to 5, for example around 4.

From the running phase, the combustion engine 4 can be temporarily useless, for example if the vehicle is stopped in a traffic jam or at a traffic light. Then, in order to save fuel, the engine arrangement 2 automatically stops the engine 4, before it is restarted in response to a signal.

The sensor 37 is configured to detect that the engine 4 has been stopped. The controller 38 then controls the actuator 33 so that it places the sun gear 21 in the third position, i.e. uncoupled from the free wheel 30 and from the engine crankshaft 5. The engine arrangement 2 is then in an electric phase (or "electrically driven accessory phase"), as shown in FIGS. 2c, 3c and 4.

Moreover, the controller 38 stops the engine 4 and starts the electric machine 6.

Thus, the electric machine 6 drives the accessory 7 and rotates the accessory pulley 9, which in turn rotates the annular gear 22 and planet gears 23. As the sun gear 21 is neither coupled to the free wheel 30 nor coupled to the engine crankshaft 5, the rotation of the planet gears 23 results in the five rotation of the sun gear 21, that is to say without the application of a resistive torque on the sun gear 21. As a consequence, the crankshaft speed and pulley speed are un-correlated.

Thus, the electric machine 6 can be rotationally disconnected from the engine 4, and the accessory 7 can be driven even if the engine 4 is stopped.

In a same way, the electric phase can be selected while engine 4 is running to reduce fuel consumption by having a more efficient electric phase.

From the electric phase, the controller 38 can calculate a need to be in another mode:

in order to restart the engine 4, the controller 38 brings the sun gear 21 back to the first position, so that the electric machine 6 can restart the engine this movement can be done passively in case a spring is provided to define a default position as previously explained;

then, the controller 38 brings the sun gear 21 in the second position. Some embodiments could require speed synchronization between the electric machine 6 and the engine 4 to ease meshing.

A drive system 101 and an engine arrangement 102 are described below according to a second embodiment of the invention. This second embodiment is represented on FIGS. 5a, 5b and 5c.

Figure 5A:
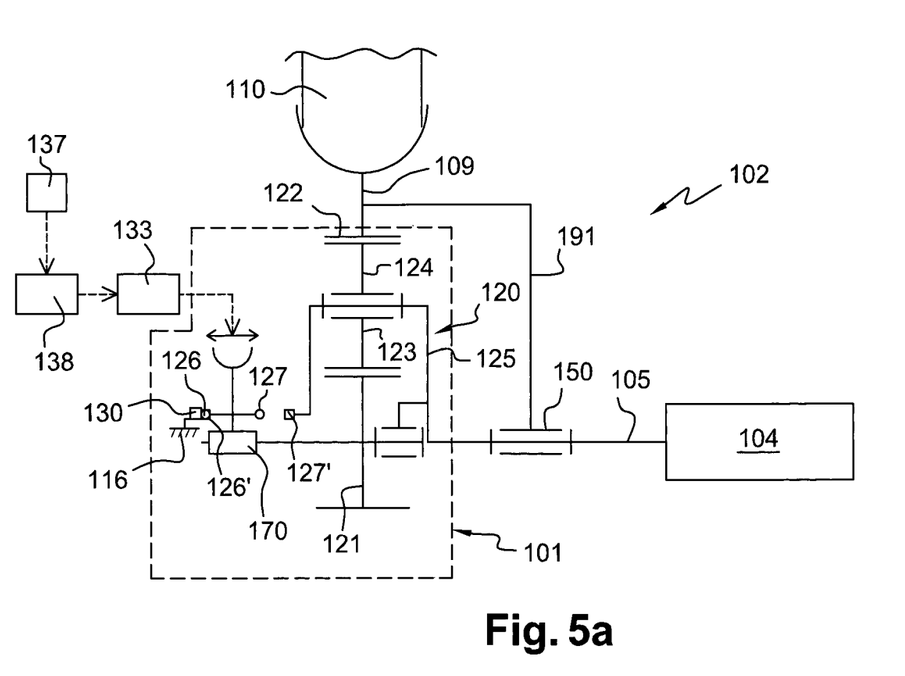
FIG. 5a, 5b, 5c represent an engine arrangement according to a second embodiment and respectively when the engine arrangement is in a starting phase, in a running phase and in an electric phase.
Figure 5B:
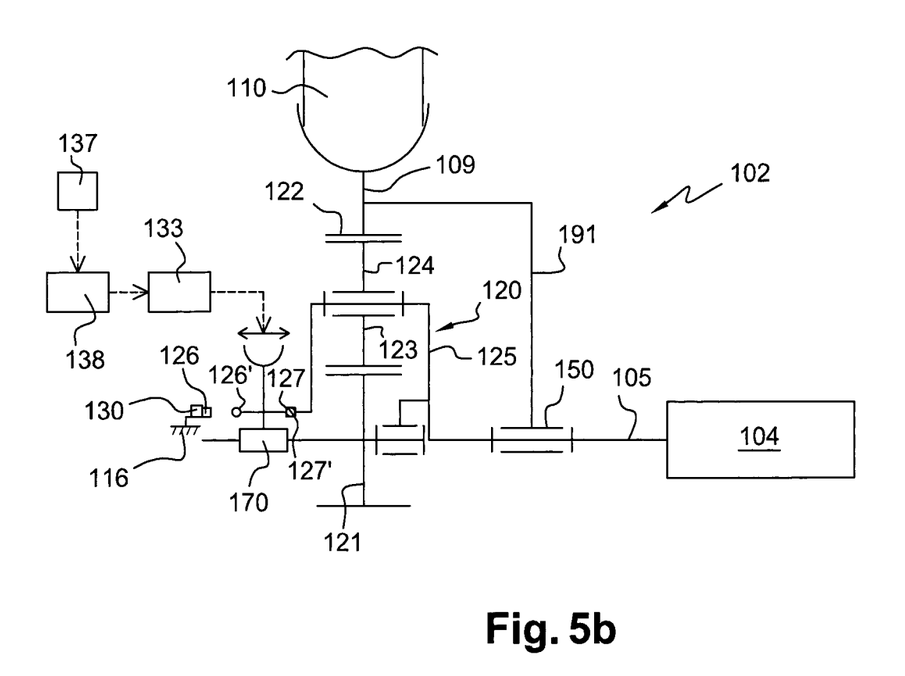
Figure 5C:
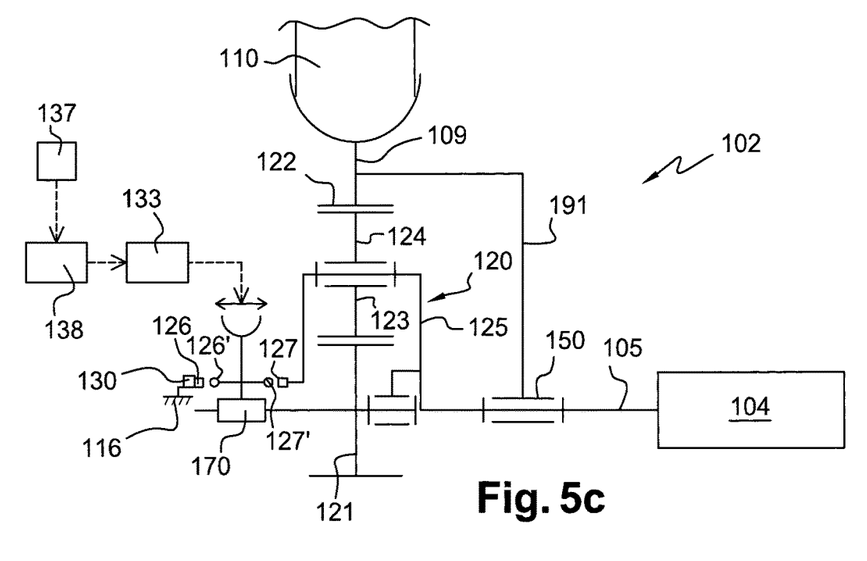

The second embodiment is represented on FIGS. 5a, 5b and 5c respectively when the engine arrangement is in a starting phase (FIG. 5a), in a running phase (5b) and in an electric phase (5c).

On FIGS. 5a, 5b and 5c the parts corresponding to the parts of FIGS. 1, 2a, 2b, 2c, 3a, 3b, 3c and 4 are indicated with references incremented by 100 compared to the references of FIGS. 1, 2a, 2b, 2c, 3a, 3b, 3c and 4.

Here below and for the sake of clarity, only differences between the second embodiment and the first embodiment are described.

Compared to the first embodiment, in the second embodiment the sun gear 121 is motionless in translation and the drive system 101 comprises a sliding selector 170 that is permanently coupled in rotation to the sun gear 121 and that is movable in translation between:

a first position, in the starting phase of FIG. 5*a*, in which, the sliding selector 170 is coupled to the free wheel 130, this first position corresponds to the first position of the first embodiment such as represented on FIG. 3*a*;

a second position, in the running phase of FIG. 5*b*, in which, the sliding selector 170 is coupled to the engine crankshaft 105, this second position corresponds to the second position of the first embodiment such as represented on FIG. 3*b*; and a third position, in the electric phase of FIG. 5*c*, in which, the sliding selector 170 is uncoupled from both the free wheel 130 and the engine crankshaft 105, this third position corresponds to the third position of the first embodiment such as represented on FIG. 3*c*.

Due to the fact that the sliding selector 170 is permanently coupled to the sun gear 121, when the sliding selector 170 is coupled to the free wheel 130, the sun gear 121 is also coupled through the sliding selector 170 to the free wheel 130, when the sliding selector 170 is coupled to the engine crankshaft 105, the sun gear 121 is also coupled through the sliding selector 170 to the engine crankshaft 105, when the sliding selector 170 is uncoupled from both the free wheel 130 and the engine crankshaft 105, the sun gear 121 is also uncoupled from both the free wheel 130 and the engine crankshaft 105.

In the second embodiment the actuator 133 is not able to push or to pull the sun gear 121 but is can push or pull the sliding selector in order to move it in one of the three positions previously described.

A drive system 201 and an engine arrangement 202 are described below according to a third embodiment of the invention. This third embodiment is represented on FIGS. 6*a*, 6*b* and 6*c*.

Figure 6A:
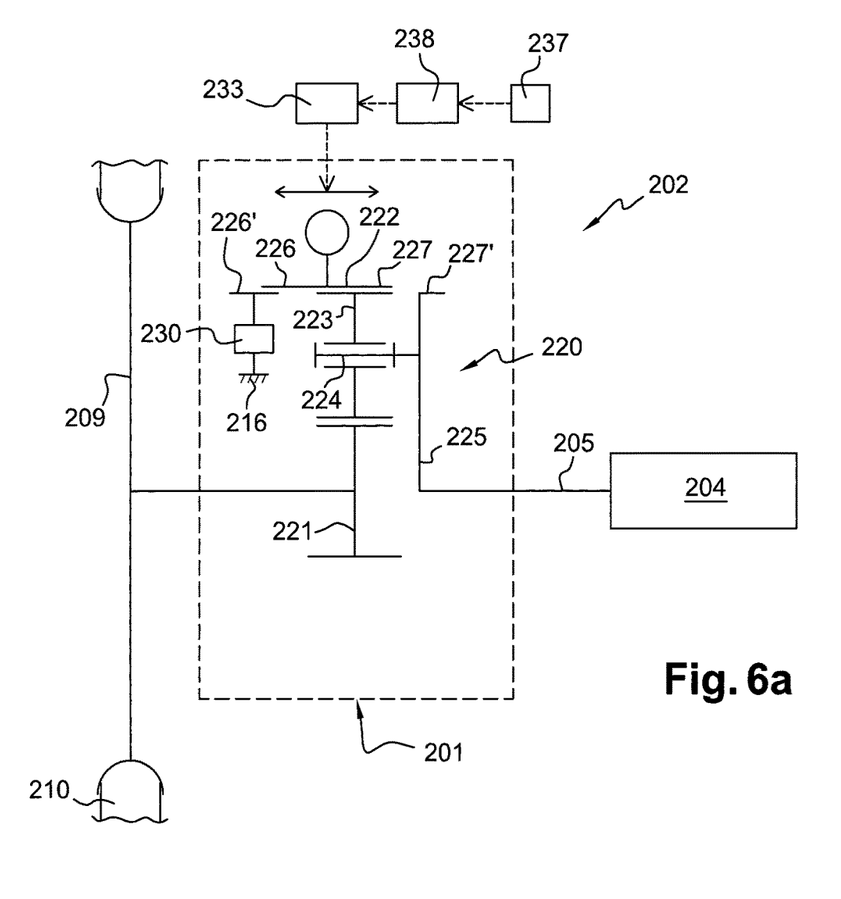
FIG. 6a, 6b, 6c represent an engine arrangement according to a third embodiment and respectively when the engine arrangement is in a starting phase, in a running phase and in an electric phase.
Figure 6B:
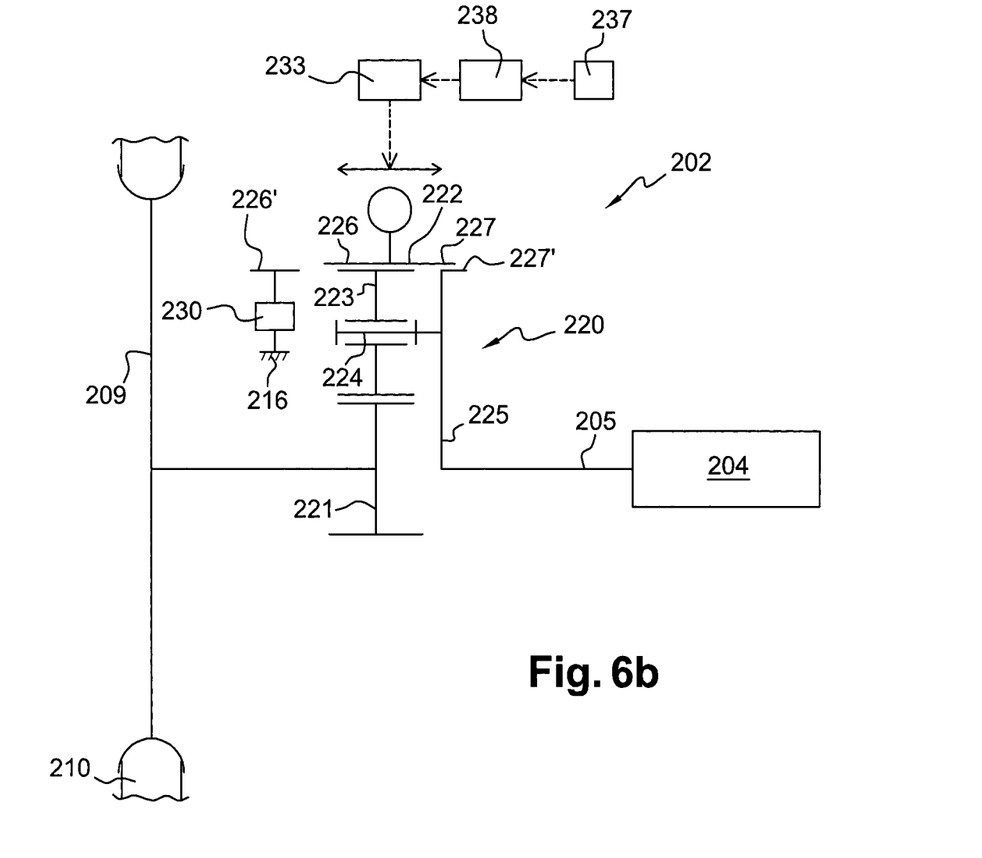
Figure 6C:
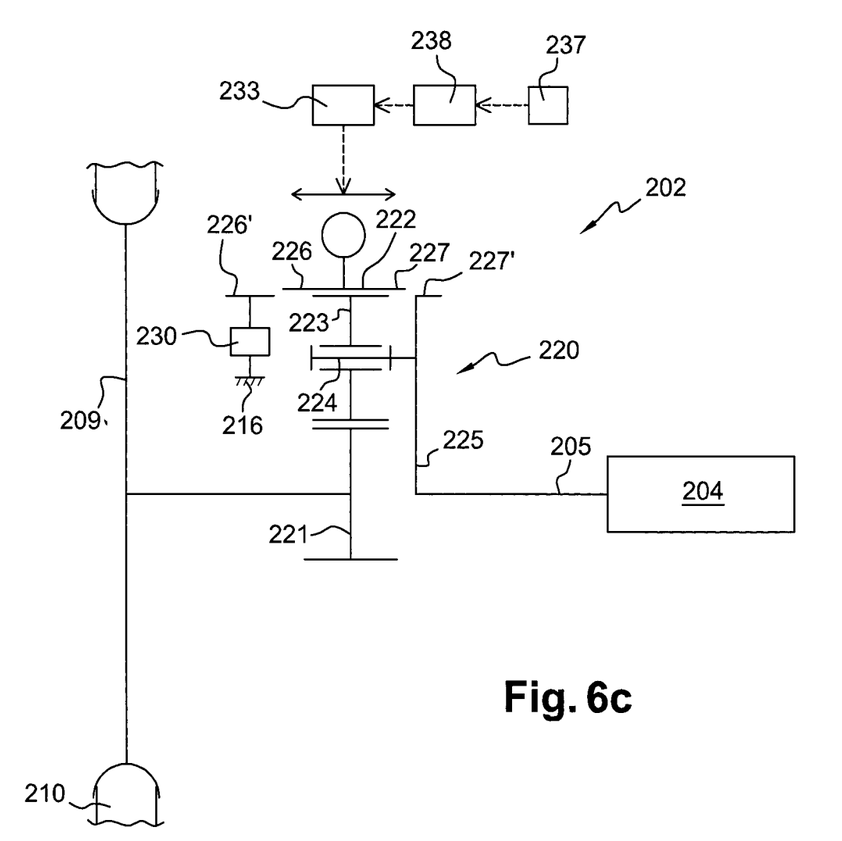

The third embodiment is represented on FIGS. 6*a*, 6*b* and 6*c* respectively when the engine arrangement is in a starting phase (FIG. 6*a*), in a running phase (6*b*) and in an electric phase (6*c*).

On FIGS. 6*a*, 6*b* and 6*c* the parts corresponding to the parts of FIGS. 1, 2*a*, 2*b*, 2*c*, 3*a*, 3*b*, 3*c* and 4 are indicated with references incremented by 200 compared to the references of FIGS. 1, 2*a*, 2*b*, 2*c*, 3*a*, 3*b*, 3*c* and 4.

Here below and for the sake of clarity, only differences between the third embodiment and the first embodiment are described.

Compared to the first embodiment, in the third embodiment the drive system 201 also comprises a gear reduction mechanism which is an epicyclic gearing 220. The epicyclic gearing 220 includes a sun gear 221, an annular gear 222, and planet gears 223 meshing with both the sun gear 221 and the annular gear 222. The planet carrier 225 is still connected to the engine crankshaft 205.

In the third embodiment, the epicyclic gearing 220 is connected to the accessory pulley 209 and to the free wheel 230 in a different manner compared to the first embodiment. Indeed, in the third embodiment, the accessory pulley 209 is connected to the sun gear 221 instead of the annular gear 222 in the first embodiment.

Instead of having a sun gear 221 that can be moved between three positions in the first embodiment, in the third embodiment it is the annular gear 222 that can be moved along a main axis 15, corresponding to the axis of the engine crankshaft, between:

a first position (FIG. 5*a*) in which the annular gear 222 is coupled to the free wheel 230;

a second position (FIG. 5*b*) in which the annular gear 222 is coupled to the engine crankshaft 205, and A third position (FIG. 5*c*) in which t e annular gear 222 is uncoupled from both the free wheel 220 and the crankshaft 205

In the third embodiment, the annular gear 222 can comprise first coupling members 226 for coupling with corresponding coupling members 226' arranged on the free wheel 330, and second coupling members 227 for coupling with corresponding coupling members 227' arranged at the end of the engine crankshaft 205 or on the planet carrier 225 such as represented on FIG. 6*a*.

An actuator 233 controlled by a controller 238 is provided to move the annular gear 222 between the three positions previously described.

Reference is now made to FIG. 6*a*, in connection with FIG. 2*a*, which shows the engine arrangement 202 in a starting phase.

In this starting phase, the electric machine 6 drives the accessory pulley 209 which in turn rotates the sun gear 221. As the annular gear 222 is coupled to the free wheel 330 which is configured to be in the engaged state at the beginning of the starting phase, the annular gear 222 does not turn, and the planet gears 223 turn about the main axis 15, therefore transmitting rotating movement to the engine crankshaft 205.

When combustion is established, engine 204 (reference 4 on FIG. 2*a*) provides torque, and therefore crankshaft 205 accelerates sharply. As the direction of the torque transmitted in the annular gear 222 changes, this automatically leads to the free wheel 230 transiting to its free state.

When the free wheel 230 is in its free state, even if the annular gear 222 remains coupled to the free wheel 230, no torque or only an insignificant torque is transmitted from the engine 204 to the electric machine 6 (FIG. 2*a*). This prevents severe stress in the belt 10 and other parts.

When the sensor 237 detects that the engine 204 has been started, the controller 238 controls the actuator 233 so that it places the annular gear 222 in the second position, i.e. coupled to the engine crankshaft 205. The engine arrangement 202 is then in a running phase, as shown on FIG. 6*b* in connection with FIG. 2*b*.

In this running phase (i.e. normal driving conditions), the engine 204 is running. The engine 204 is then capable of driving the accessory 7, and also the electric machine 6 so that said electric machine 6 can charge the battery 8. In the same way, the electric machine 6 can be put in motor mode, providing additional torque to accessory 7 and engine crankshaft 205, by consuming energy stored in battery 8.

More precisely, the crankshaft rotation leads to the rotation of the planet gears 223 about the main axis 15 and to the rotation of the accessory pulley 209 which is coupled to the sun gear 221.

To initiate an electric phase, the controller 238 can control the actuator 233 so that it places the annular gear 222 in the third position, i.e. uncoupled from the free wheel 230 and from the accessory pulley 209. The engine arrangement 202 is then in an electric phase as shown on FIG. 5*c* in connection with FIG. 2*c*

Thus, the electric machine 6 drives the accessory 7 and rotates the accessory pulley 209, which in turn rotates the sun gear 221 and planet gears 223. As the annular gear 222 is not coupled to the free wheel 230 or to the engine crankshaft 205, the rotation of the planet gears 223 results in the free rotation of the annular wear 222, that is to say without the application of a resistive torque on the annular gear 222. As a consequence, the crankshaft speed and pulley speed are un-correlated.

Thus, the electric machine 6 can be rotationally disconnected from the engine 4, and the accessory 7 can be driven even if the engine 4 is stopped.

It is to be understood that the present invention is not limited to the embodiments described above and illustrated in the drawings; rather, the skilled person will recognize that many changes and modifications may be made to the described embodiments which are within the scope of the present invention.

The invention claimed is:

1. A drive system for an engine arrangement, the drive system comprising a gear reduction mechanism having at least three separate and rotatable junction elements, the rotation speeds of the junction elements being interdependent, and wherein, in a mounted position, among the junction elements:
   a first junction element is connected to an engine crankshaft;
   a second junction element is connected to an accessory pulley which is drivingly connected to an electric machine and at least one accessory;
   a third junction element;
   wherein the drive system further comprises a free wheel which is connected to a non-rotating part of the engine arrangement in the mounted position, and the third junction element is configured to be coupled to the free wheel in a first operating phase of the drive system,
   wherein the third junction element comprises first coupling members for coupling with the free wheel, and second coupling members for coupling with the engine crankshaft or with the first junction element,
   wherein, in the first operating phase, the free wheel is configured such that when the third junction element exerts torque on the free wheel in one direction, the free wheel is in an engaged state and stops the rotation of the third junction element, and when the third junction element exerts torque on the free wheel in the opposite direction, the free wheel is in a free state and allows rotation of the third junction element,
   wherein, the third junction element is further configured to be coupled to the engine crankshaft, in a second operating phase.

2. The drive system according to claim 1, wherein in the first operating phase of the drive system the third junction element is uncoupled from the engine crankshaft when the third junction element is coupled to the free wheel and in the second operating phase the third junction element is uncoupled from the free wheel when the third junction element is coupled to the engine crankshaft.

3. The drive system according to claim 1, wherein in the second operating phase the third junction element is coupled to the engine crankshaft via the first junction element.

4. The drive system according to claim 1, wherein the third junction element is movable between a first position, in the first operating phase, in which, in the mounted position, it is coupled to the free wheel, and a second position, in the second operating phase, in which, in the mounted position, it is coupled to the engine crankshaft.

5. The drive system according to claim 4, wherein the drive system has a main axis and in that the third junction element is movable in translation along the main axis.

6. The drive system according to claim 1, wherein the first and/or second coupling members comprise(s) a dog clutch.

7. The drive system according to claim 4, wherein the third junction element is further configured to take a third position where it is uncoupled from the free wheel and from the engine crankshaft, in a third operating phase.

8. The drive system according to claim 1, wherein the gear reduction mechanism comprises an epicyclic gearing including a sun gear, an annular gear, planet gears meshing with both the sun gear and the annular gear and supported by a planet carrier.

9. The drive system according to claim 8, wherein each of the sun gear, the annular gear and the planet carrier is connected to cane of the junction elements.

10. The drive system according to claim 8, wherein the first junction element is part of the planet carrier, the second junction element is part of the annular gear, and the third junction element is part of the sun gear.

11. The drive system according to claim 1, wherein, in the mounted position, the free wheel is fixedly mounted on a carter or a non-rotative part linked to engine block of the engine arrangement.

12. An engine arrangement comprising a drive system according to claim 1.

13. The engine arrangement according to claim 12, wherein the at least one accessory is one of: a water pump, an air conditioner compressor, a cooling fan.

14. The engine arrangement according to claim 12, wherein it further comprises at least one sensor for detecting the operating condition of the engine, a controller connected to the sensor and capable of controlling an actuator configured to allow coupling or uncoupling the third junction element of the gear reduction mechanism and the free wheel.

15. The engine arrangement according to claim 14, when the drive system is according to claim 7, wherein the actuator is configured to move the third junction element of the gear reduction mechanism or a sliding selector coupled to the third junction to place it in one of its first, second and third positions, depending on the detected engine operating condition.

16. A vehicle, wherein it comprises an engine arrangement according to claim 1.

17. A method for operating an engine arrangement, the engine arrangement comprising:
   an engine,
   an electric machine and at least one accessory, the electric machine and the accessory being drivingly connected to an accessory pulley, and
   a drive system comprising:
      a gear reduction mechanism having at least three separate and rotatable junction elements, the rotation speeds of the junction elements being interdependent, the gear reduction mechanism joining the accessory pulley and an engine crankshaft via two junction elements of the gear reduction mechanism;
      a free wheel which is connected to a non-rotating part of the engine arrangement and which can be coupled to the gear reduction mechanism via a third junction element of the gear reduction mechanism; and
      an epicyclic gearing as the gear reduction mechanism, the epicyclic gearing including a sun gear, an annular gear, planet gears meshing with both the sun gear and the annular gear and supported by a planet carrier, wherein the planet carrier is connected to the engine crankshaft and the annular gear is connected to the accessory pulley, wherein the third junction element is configured to be coupled to the free wheel or to the engine crankshaft, or to be uncoupled from both the free wheel and the engine crankshaft;

the method comprising the steps of:
  detecting at least one parameter indicating if the engine arrangement is in a starting phase, in a running phase, or in an electric phase, respectively;
  if it is detected that the engine arrangement is in the starting phase, controlling the drive system to couple the third junction element of the gear reduction mechanism with the free wheel;
  if it is detected that the engine arrangement is in the running phase, controlling the drive system to couple the third junction element of the gear reduction mechanism with the engine crankshaft instead of the free wheel;
  if it is detected that the engine arrangement is in the electric phase, controlling the drive system to uncouple the third junction element from the engine crankshaft and from the free wheel;
  controlling the position of the sun gear, or of a sliding selector coupled to the sun gear, relative to the free wheel or to the engine crankshaft such that the sun gear is coupled to the free wheel when the engine arrangement is in a starting phase, the sun gear is coupled to the engine crankshaft when the engine arrangement is in a running phase, or the sun gear is uncoupled from both the free wheel and the engine crankshaft.

18. The method according to claim 17, wherein, while the third junction element is still coupled to the free wheel and the electric machine is starting the engine, the free wheel is firstly operated in an engaged state and is then operated in a free state when the engine has started.

19. The method according to claim 17, wherein the reduction ratio between the rotational speeds of the accessory pulley and the crankshaft is: R1b in the running phase, with R1b being substantially 1; R1a in the starting phase, with R1a not equaling Rib, R1a being around 4.

* * * * *